United States Patent
Hu et al.

(10) Patent No.: US 12,464,472 B2
(45) Date of Patent: Nov. 4, 2025

(54) UPLINK POWER CONTROL METHOD AND APPARATUS

(71) Applicant: HUAWEI TECHNOLOGIES CO., LTD., Shenzhen (CN)

(72) Inventors: Dan Hu, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 459 days.

(21) Appl. No.: 17/975,876

(22) Filed: Oct. 28, 2022

(65) Prior Publication Data

US 2023/0047985 A1 Feb. 16, 2023

Related U.S. Application Data

(63) Continuation of application No. PCT/CN2021/091400, filed on Apr. 30, 2021.

(30) Foreign Application Priority Data

Apr. 30, 2020 (CN) .......................... 202010365865.3

(51) Int. Cl.
*H04W 52/14* (2009.01)

(52) U.S. Cl.
CPC ................................. *H04W 52/146* (2013.01)

(58) Field of Classification Search
CPC ... H04W 52/146; H04W 72/04; H04W 72/23; H04W 72/1268; H04L 1/08; H04L 5/00; H04B 7/06
See application file for complete search history.

(56) References Cited

U.S. PATENT DOCUMENTS

| 2013/0128833 A1 | 5/2013 | Lee et al. |
| 2020/0106559 A1* | 4/2020 | Vilaipornsawai ..... H04L 1/1896 |
| 2021/0226680 A1* | 7/2021 | Khoshnevisan ...... H04L 5/0091 |

FOREIGN PATENT DOCUMENTS

| CN | 106455030 A | 2/2017 |
| CN | 108271175 A | 7/2018 |

(Continued)

OTHER PUBLICATIONS

Institute for Information Industry(III): "Power control for multi-TRP uplink transmission", 3GPP Draft; R1-1907372, vol. RAN WG1, No. Reno USA; May 13, 2019-May 17, 2019, May 13, 2019 (May 13, 2019), XP051728810 (Year: 2019).*

(Continued)

*Primary Examiner* — John J Lee

(57) ABSTRACT

A terminal device receives first indication information indicating first precoding information and second precoding information. The terminal device determines a first group of power control parameters corresponding to the first precoding information and determines a second group of power control parameters corresponding to the second precoding information. The terminal device determines first transmit power based on the first group of power control parameters and sends a first PUSCH repetition based on the first transmit power and the first precoding information, and determines second transmit power based on the second group of power control parameters and sends a second PUSCH repetition based on the second transmit power and the second precoding information.

12 Claims, 6 Drawing Sheets

(56) References Cited

FOREIGN PATENT DOCUMENTS

| | | |
|---|---|---|
| CN | 108811064 A | 11/2018 |
| CN | 109803362 A | 5/2019 |
| CN | 110831135 A | 2/2020 |
| RU | 2565663 C1 | 10/2015 |
| RU | 2627299 C1 | 8/2017 |
| RU | 2701380 C1 | 9/2019 |
| WO | 2022067866 A1 | 4/2022 |

OTHER PUBLICATIONS

Institute for Information Industry (III), Power control for multi-TRP uplink transmission. 3GPP TSG RAN WG1 Meeting #97, Reno, USA, May 13-17, 2019, R1-1907372, 5 pages.

3GPP TS 38.212 V16.1.0 (Mar. 2020), 3rd Generation Partnership Project; Technical Specification Group Radio Access Network; NR; Multiplexing and channel coding(Release 16), 146 pages.

3GPP TSG-RAN WG1 Meeting #96, R1-1903368, Summary of contributions on potential enhancements for PUSCH for NR URLLC (AI 7.2.6.1.3), Nokia, Nokia Shanghai Bell, Athens, Greece, Feb. 25-Mar. 1, 2019, total 26 pages.

3GPP TS 38.213 V16.1.0 (Mar. 2020), 3rd Generation Partnership Project; Technical Specification Group Radio Access Network; NR; Physical layer procedures for control(Release 16), 156 pages.

3GPP TSG RAN WG1 Meeting #96bis, R1-1903970, Enhancements on Multi-TRP/panel transmission, Huawei, HiSilicon, XI an, China, Apr. 8-12, 2019, total 20 pages.

3GPP TS 38.214 V16.1.0 (Mar. 2020), 3rd Generation Partnership Project; Technical Specification Group Radio Access Network; NR; Physical layer procedures for data(Release 16), 151 pages.

3GPP TSG RAN WG1 #100bis , R1-2001613, Remaining issues on PUSCH enhancements for NR URLLC, ZTE , e-Meeting, Apr. 20-24, 2020, total 14 pages.

3GPP TS 38.331 V16.0.0 (Mar. 2020), 3rd Generation Partnership Project; Technical Specification Group Radio Access Network; NR; Radio Resource Control (RRC) protocol specification(Release 16), 834 pages.

3GPP TSG RAN meeting #86, RP-192553, Physical Layer Enhancements for NR Ultra-Reliable and Low Latency Communication (URLLC), Sitges, Spain, Dec. 9-12, 2019, total 26 pages.

* cited by examiner

UPLINK POWER CONTROL METHOD AND APPARATUS

CROSS-REFERENCE TO RELATED APPLICATIONS

This application is a continuation of International Application No. PCT/CN2021/091400 filed on Apr. 30, 2021, which claims priority to Chinese Patent Application No. 202010365865.3 filed on Apr. 30, 2020. The disclosures of the aforementioned applications are hereby incorporated by reference in their entireties.

TECHNICAL FIELD

This disclosure relates to the field of communication technologies, and in particular, to an uplink power control method and apparatus.

BACKGROUND

The International Telecommunication Union (ITU) defines three types of application scenarios for 5G and a future mobile communication system: enhanced mobile broadband (eMBB), ultra-reliable low-latency communication (URLLC), and massive machine-type communications (mMTC). Typical URLLC services include tactile interactive applications such as wireless control in industrial manufacturing or production processes, motion control in self-driving, remote repair, and remote surgery. The services are mainly characterized by ultra-high reliability, a low latency, a small data transmission amount, burstiness, and the like. How to ensure transmission reliability of the URLLC services is a technical problem to be resolved in embodiments of this application.

SUMMARY

Embodiments of this disclosure provide an uplink power control method and apparatus to ensure transmission reliability of URLLC services.

According to a first aspect, an uplink power control method is provided. The method may be executed by a terminal device or may be executed by a chip in the terminal device. The following provides descriptions by using an example in which an execution body is the terminal device. The terminal device receives first indication information from a network device, where the first indication information indicates first precoding information and second precoding information, the first precoding information corresponds to a first PUSCH repetition, and the second precoding information corresponds to a second PUSCH repetition. The terminal device determines a first group of power control parameters corresponding to the first precoding information and a second group of power control parameters corresponding to the second precoding information; then determines first transmit power based on the first group of power control parameters, and sends a first PUSCH repetition based on the first transmit power and the first precoding information; and determines second transmit power based on the second group of power control parameters, and sends a second PUSCH repetition based on the second transmit power and the second precoding information. For a same service, the terminal device sends a PUSCH to a network device twice: the first PUSCH repetition and the second PUSCH repetition. This can improve uplink service reliability. Further, the terminal device may send PUSCH repetitions to different network devices. For example, the terminal device may send the first PUSCH repetition to a first TRP, and send the second PUSCH repetition to a second TRP. Because distances from different TRPs to the terminal device are different, and channel conditions are also different, the first PUSCH repetition sent to the first transmission/reception point TRP and the second PUSCH repetition sent to the second TRP are separately determined by using different power control parameters. This can improve performance and reliability of a PUSCH repetition.

In a possible design, the terminal device may receive second indication information from the network device, where the second indication information indicates a first group of power control parameters and a second group of power control parameters. The terminal device may determine, from a power control parameter set based on the second indication information, the first group of power control parameters corresponding to the first precoding information and the second group of power control parameters corresponding to the second precoding information. In this embodiment of this application, the second indication information may flexibly indicate the first group of power control parameters and the second group of power control parameters.

In another possible design, the terminal device may determine the first group of power control parameters and the second group of power control parameters from the power control parameter set according to a preset rule. Optionally, the preset rule includes: the first group of power control parameters and the second group of power control parameters are two groups of power control parameters with smallest indexes in the power control parameter set. The terminal device may determine the first group of power control parameters and the second group of power control parameters without additional indication from the network device. This reduces signaling overheads.

In another possible design, the first indication information further indicates the first group of power control parameters and the second group of power control parameters. In addition to the first precoding information and the second precoding information, the terminal device may further determine the first group of power control parameters and the second group of power control parameters based on the first indication information. It can be learned that both precoding information and the power control parameters can be prompted via one piece of indication information, thereby reducing signaling overheads.

In another possible design, the power control parameter set includes one or more of the following sets: a PUSCH open-loop power control parameter set, a PUSCH path loss reference signal group set, or a closed-loop accumulated process number set.

The PUSCH open-loop power control parameter set includes one or more groups of open-loop power control parameters constituted by a basic power control parameter P0 and a path loss compensation factor alpha, the PUSCH path loss reference signal group set includes one or more path loss reference signal indexes qd, and the closed-loop accumulated process number set includes one or more closed-loop accumulated process numbers l.

In a possible design, the first group of power control parameters and the second group of power control parameters each include at least one of the following: the basic power control parameter P0, the path loss compensation factor alpha, the path loss reference signal group index qd, or the closed-loop accumulated process number l.

According to a second aspect, an uplink power control method is provided. The method is performed by a network device, or may be performed by a chip in the network device. The following provides descriptions by using an example in which an execution body is the network device. The network device sends first indication information to a terminal device, where the first indication information indicates first precoding information and second precoding information, the first precoding information corresponds to a first group of power control parameters for a first physical uplink shared channel PUSCH repetition, and the second precoding information corresponds to a second group of power control parameters for a second PUSCH repetition; and the network device receives the first PUSCH repetition from the terminal device based on the first precoding information.

In a possible design, the network device may send second indication information to the terminal device, where the second indication information indicates the first group of power control parameters and the second group of power control parameters in a power control parameter set. According to the foregoing design, the network device may indicate the precoding information via the first indication information, and indicate the power control parameter via the second indication information. The first indication information and the second indication information do not affect each other, which provides a flexible indication manner.

In a possible design, the first indication information further indicates the first group of power control parameters and the second group of power control parameters. According to the foregoing design, the network device may indicate both the precoding information and the power control parameter via a same piece of indication information. Compared with a current technology, signaling overhead can be reduced.

In a possible design, the network device may determine, from a power control parameter set according to a preset rule, the first group of power control parameters corresponding to the first precoding information. Optionally, the preset rule includes: either of two groups of power control parameters with smallest indexes in the power control parameter set is the first group of power control parameters. According to the foregoing descriptions, signaling overheads are reduced as the network device does not need to additionally indicate the power control parameter.

In a possible design, the power control parameter set includes at least one of the following sets: a PUSCH open-loop power control parameter set, a PUSCH path loss reference signal group set, or a closed-loop accumulated process number set, where the PUSCH open-loop power control parameter set includes one or more groups of open-loop power control parameters constituted by a basic power control parameter P0 and a path loss compensation factor alpha, the PUSCH path loss reference signal group set includes one or more path loss reference signal indexes qd, and the closed-loop accumulated process number set includes one or more closed-loop accumulated process numbers l.

In a possible design, the first group of power control parameters and the second group of power control parameters each include at least one of the following: the basic power control parameter P0, the path loss compensation factor alpha, the path loss reference signal group index qd, and the closed-loop accumulated process number l.

According to a third aspect, an uplink power control method is provided. For beneficial effects, refer to the descriptions of the first aspect. The communication apparatus has functions of implementing behavior in the method embodiment in the first aspect. The functions may be implemented by hardware by executing corresponding software. The hardware or the software includes one or more modules corresponding to the foregoing functions. In a possible design, the communication apparatus includes: a transceiver module, configured to receive first indication information from a network device, where the first indication information indicates first precoding information and second precoding information, the first precoding information corresponds to a first physical uplink shared channel PUSCH repetition, and the second precoding information corresponds to a second PUSCH repetition; a processing module, configured to determine a first group of power control parameters corresponding to the first precoding information and a second group of power control parameters corresponding to the second precoding information; determine first transmit power based on the first group of power control parameters, and send the first PUSCH repetition based on the first transmit power and the first precoding information; and determine second transmit power based on the second group of power control parameters, and send the second PUSCH repetition based on the second transmit power and the second precoding information. These modules may perform corresponding functions in the method examples in the first aspect. For details, refer to the detailed descriptions in the method examples. Details are not described herein again.

According to a fourth aspect, a communication apparatus is provided. For beneficial effects, refer to descriptions in the second aspect. Details are not described herein again. The communication apparatus has functions of implementing behavior in the method examples in the second aspect. The functions may be implemented by hardware, or may be implemented by hardware executing corresponding software. The hardware or the software includes one or more modules corresponding to the foregoing functions. In a possible design, the communication apparatus includes: a communication module, configured to send first indication information to a terminal device, where the first indication information indicates first precoding information and second precoding information, the first precoding information corresponds to a first group of power control parameters for a first physical uplink shared channel PUSCH repetition, and the second precoding information corresponds to a second group of power control parameters for a second PUSCH repetition; and a processing module, configured to receive the first PUSCH repetition from the terminal device based on the first precoding information to control the communication module. These modules may perform corresponding functions in the method examples in the second aspect. For details, refer to the detailed descriptions in the method examples. Details are not described herein again.

According to a fifth aspect, a communication apparatus is provided. The communication apparatus may be the terminal device in the foregoing method embodiments or a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the methods performed by the terminal device in the foregoing method embodiments.

According to a sixth aspect, a communication apparatus is provided. The communication apparatus may be the network device in the foregoing method embodiments, or a chip disposed in the network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the methods performed by the network device in the foregoing method embodiments.

According to a seventh aspect, a computer program product is provided. The computer program product includes computer program code. When the computer program code is run, the methods performed by the terminal device in the foregoing aspects are enabled to be performed.

According to an eighth aspect, a computer program product is provided. The computer program product includes computer program code. When the computer program code is run, the methods performed by the network device in the foregoing aspects are enabled to be performed.

According to a ninth aspect, this disclosure provides a chip system. The chip system includes a processor, configured to implement functions of the terminal devices in the methods in the foregoing aspects. In a possible design, the chip system further includes a memory, configured to store program instructions and/or data. The chip system may include a chip, or may include a chip and another discrete component.

According to a tenth aspect, this disclosure provides a chip system. The chip system includes a processor, configured to implement functions of the network devices in the methods in the foregoing aspects. In a possible design, the chip system further includes a memory, configured to store program instructions and/or data. The chip system may include a chip, or may include a chip and another discrete component.

According to an eleventh aspect, this disclosure provides a computer-readable storage medium storing a computer program. When the computer program is run, the methods performed by the terminal device in the foregoing aspects are implemented.

According to a twelfth aspect, this disclosure provides a computer-readable storage medium storing a computer program. When the computer program is run, the methods performed by the network device in the foregoing aspects are implemented.

DESCRIPTION OF EMBODIMENTS

Figure 1:
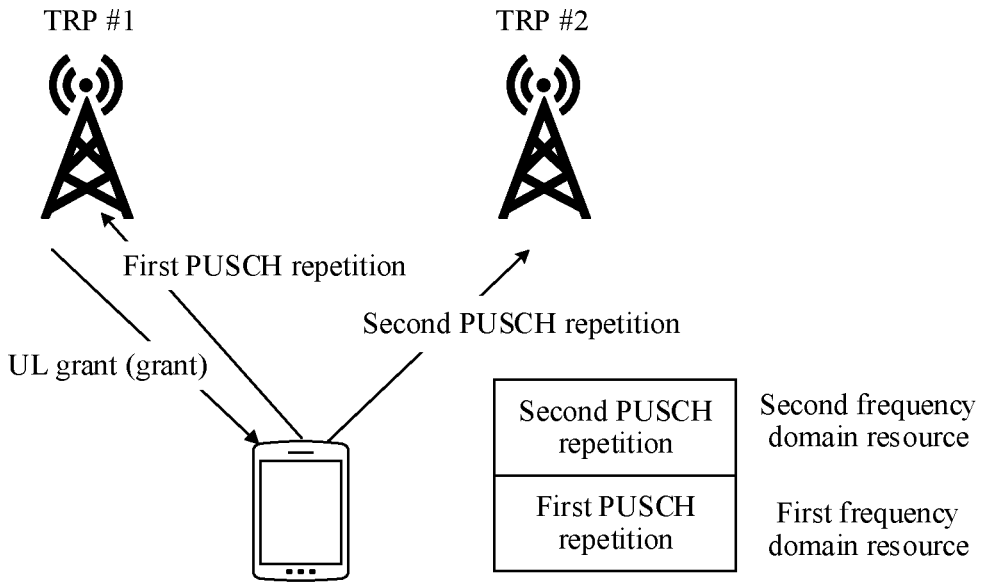
FIG. 1 and FIG. 2 each are a schematic diagram of PUSCH repetition transmission according to an embodiment.

First, concepts or terms used to describe embodiments are also used throughout this disclosure.

1. Terminal Device

A terminal device may be briefly referred to as a terminal, or referred to as user equipment (UE), which is a device having a wireless transceiver function. The terminal device may be deployed on land, where the deployment includes indoor or outdoor, or handheld or vehicle-mounted deployment, may be deployed on water (for example, on a ship), or may be deployed in air (for example, on aircraft, an unmanned aerial vehicle, a balloon, or a satellite). The terminal device may be a mobile phone, a tablet computer, a computer having a wireless transceiver function, a virtual reality terminal device, an augmented reality terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, a wireless terminal device in a smart home, or the like. The terminal device may be fixed or mobile. This is not limited in embodiments of this disclosure.

An apparatus configured to implement functions of the terminal may be a terminal device, or may be an apparatus, for example, a chip system, that can support the terminal device in implementing the functions. The apparatus may be installed in the terminal device. In this embodiment, the chip system may include a chip, or may include a chip and another discrete component. The technical solutions provided in embodiments are described by using an example in which the apparatus configured to implement functions of the terminal device is the terminal device.

2. Network Device

A network device may be an access network device. The access network device may also be referred to as a radio access network (radio access network, RAN) device, and is a device that provides a wireless communication function for a terminal device. The access network device includes, for example, but is not limited to, a next generation NodeB (gNB), an evolved NodeB (evolved NodeB or eNB), a baseband unit (BBU), a transmitting and receiving point (TRP), or a transmitting point (TP) in 5G, a base station in a future mobile communication system, or an access point in a Wi-Fi system. Alternatively, the access network device may be a radio controller, a central unit (CU), and/or a distributed unit (DU) in a cloud radio access network (CRAN) scenario, or the network device may be a relay station, a vehicle-mounted device, a network device in a future evolved public land mobile (PLMN) network, or the like.

The terminal device may communicate with a plurality of access network devices by using different technologies. For example, the terminal device may communicate with an access network device supporting long term evolution (LTE), may communicate with an access network device supporting 5G, or may communicate with both an access network device supporting LTE and an access network device supporting 5G. This is not limited in embodiments of this disclosure.

An apparatus configured to implement functions of the network device may be a network device, or may be an apparatus, for example, a chip system, that can support the network device in implementing the functions. The apparatus may be installed in the network device. The technical solutions provided in embodiments of this disclosure are described by using an example in which the apparatus configured to implement functions of the network device is the network device.

3. Uplink (UL) Configured Grant (CG)

The uplink configured grant means that uplink transmission of the terminal device is performed without requiring scheduling of the network device, and the terminal device performs uplink transmission based on configuration information instead.

Uplink configured grant transmission is also referred to as grant-free (GF) or scheduling-free uplink transmission. The uplink configured grant includes two types: a type-1 uplink configured grant and a type-2 uplink configured grant. A difference lies in that all parameters in the type-1 uplink configured grant are preconfigured by the network device. Therefore, when sending uplink service data using the type-1 uplink configured grant, the terminal device directly uses the parameters configured by the network device, without requiring additional scheduling information. However, when sending the uplink service data using the type-2 uplink configured grant, the terminal device performs uplink data transmission by additionally receiving a piece of trigger information. The trigger information may be downlink control information (downlink control information, DCI) or the like.

For the type-1 and type-2 uplink configured grants, one or more of the following information may be preconfigured by using a higher-layer parameter:

a frequency hopping mode, a demodulation reference signal (DMRS) configuration, modulation and coding scheme (MCS) table selection, frequency domain resource allocation mode selection, physical uplink shared channel (PUSCH) resource block group (RBG) size configuration selection, power control loop selection, open-loop power control parameters (including a target signal-to-noise ratio and a path loss compensation factor), a hybrid automatic repeat request (HARQ) process quantity, a retransmission quantity, a redundancy version sequence, and a periodicity.

Further, for the type-1 uplink configured grant, in addition to one or more of the above information, the configuration information may further include:

time-frequency resource allocation, a time domain offset, an antenna port, precoding information, a quantity of layers, a sounding reference signal (SRS) resource indication, a modulation order, a target bit rate, a transport block size, a frequency hopping offset, a path loss reference index, a Beta-offset indication, and the like.

For the type-2 uplink configured grant, resource allocation is performed based on the configuration of the foregoing higher-layer parameter.

In addition, the terminal device performs scheduling-free transmission only after receiving the trigger information.

4. PUSCH Repetition

PUSCH repetition may mean that the network device sends one uplink grant indication or one grant-free indication, to indicate one or more nominal PUSCH repetition transmissions. After receiving the uplink grant indication or the uplink grant-free indication, the terminal device transmits one or more actual PUSCH repetitions in one slot, or transmits two or more actual PUSCH repetitions in a plurality of consecutive available slots based on the uplink grant indication or the uplink grant-free indication. In this embodiment, an example in which two actual PUSCH repetitions are transmitted is used for description.

The network device adds a column to a time domain resource allocation table, to indicate a number of transmitted type-B PUSCH repetitions. A value of the number may be {1, 2, 3, 4, 7, 8, 12, 16}. Uplink scheduling signaling or first-type grant-free configuration information indicates a start symbol S and duration L of a $1^{st}$ nominal PUSCH, and duration L of all nominal PUSCH repetitions is the same, where $0 \le S \le 13$, $1 \le L \le 14$, and S and L each are indicated by 4 bits in higher layer signaling. This can implement that S+L>14. Transport block sizes (TBSs) of the nominal and actual PUSCH repetitions are determined based on a time domain length L of the nominal PUSCH. Starting from a $2^{nd}$ nominal PUSCH, a start symbol of a nominal PUSCH repetition follows an end symbol of a previous nominal PUSCH repetition.

Before determining a time domain resource of the actual PUSCH repetition, the terminal device needs to determine an invalid symbol (invalid symbol). The terminal device determines the invalid symbol in the following manner.

A downlink symbol semi-statically configured by using a higher-layer parameter (for example, tdd-UL-DL-ConfigurationCommon or tdd-UL-DL-ConfigurationDedicated) is an invalid symbol.

A symbol-level bitmap (bitmap) is configured by using a higher-layer parameter (for example, InvalidSymbolPattern), and a bit value equal to 1 indicates that a corresponding symbol is invalid. When DCI format 0_1 or 0_2 schedules PUSCH repetition, or second-type grant-free PUSCH repetition is activated, and a 1-bit invalid symbol pattern indication information field is configured in the DCI, when a value of the invalid symbol pattern indication information field is 1, the terminal device applies an invalid symbol pattern; otherwise, the terminal device ignores an invalid symbol pattern. If the DCI does not include an invalid symbol pattern indication information field, the terminal device directly applies the invalid symbol pattern based on a configuration of the higher-layer parameter InvalidSymbolPattern. The invalid symbol pattern indication information field is independently configured for different DCI formats.

After the terminal device determines an invalid symbol in each nominal PUSCH time domain resource based on PUSCH repetition Type B, a remaining symbol may be considered as a potentially valid symbol. If a quantity of consecutive potentially valid symbols of a nominal PUSCH in a slot is greater than 0, one actual PUSCH repetition may be mapped, and time domain resources of one nominal PUSCH repetition may include time domain resources of one or more actual PUSCH repetitions. The terminal device does not send an actual PUSCH repetition of a single symbol unless the single symbol is duration L of a nominal PUSCH indicated by the network device.

For a grant-free PUSCH repetition Type B, if a dynamic slot format indicator (SFI) is received within entire duration of an actual PUSCH repetition, and collision between the actual PUSCH repetition and a dynamic downlink or flexible symbol occurs, the actual PUSCH repetition is not to be sent; or if no dynamic SFI is received on at least one symbol within duration of an actual PUSCH repetition, and collision between the actual PUSCH repetition and at least one semi-static flexible symbol occurs, the actual PUSCH repetition is not to be sent.

To improve transmission reliability of a URLLC service, a solution is provided: Two transmission reception points (TRPs) collaboratively process and receive a PUSCH, to improve transmission reliability of the PUSCH. The process may be as follows: TRP #1 sends an uplink grant (UL grant) to UE, and the UE sends first PUSCH repetition and second PUSCH repetition to TRP #1 and TRP #2 respectively. Optionally, the first PUSCH repetition corresponds to first precoding information, and the second PUSCH repetition corresponds to second precoding information. Different precoding information may include different transmit beams (corresponding to analog precoding mechanisms, where the UE changes a transmit beam by changing a phase of a phase shifter), different antenna ports, different antenna virtualization manners (corresponding to digital precoding mechanisms, where the UE generates different transmit beams based on digital weights between different antennas), or the like.

Figure 2:
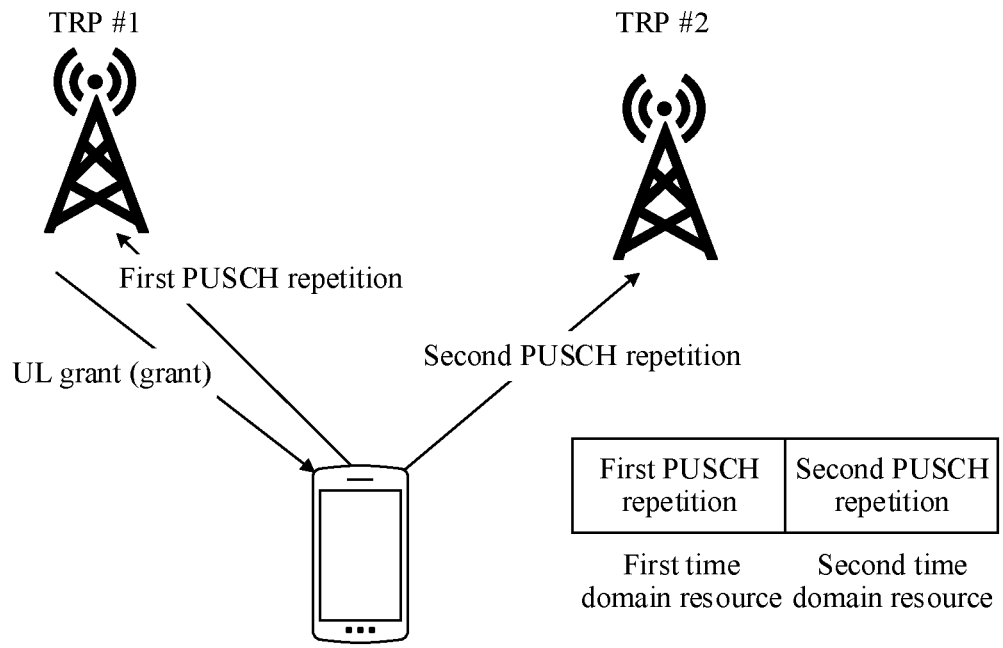

As shown in FIG. 1, the first PUSCH repetition and the second PUSCH repetition occupy a same time domain resource but different frequency domain resources. For example, the first PUSCH repetition may occupy a first frequency domain resource, and the second PUSCH repetition may occupy a second frequency domain resource. Alternatively, as shown in FIG. 2, the first PUSCH repetition and the second PUSCH repetition may occupy a same frequency domain resource but different time domain resources. For example, the first PUSCH repetition may occupy a first time domain resource, and the second PUSCH repetition may occupy a second time domain resource.

In this solution, the first PUSCH repetition and the second PUSCH repetition correspond to a same group of power control parameters, meaning that the first PUSCH repetition and the second PUSCH repetition correspond to same transmit power. Because distances from different TRPs to UE are different, and channel conditions are also different, it is inappropriate to calculate transmit power of two PUSCH repetitions by using a same power control parameter. This affects performance of PUSCH repetition transmission, and further reduces reliability of the PUSCH repetition transmission.

Figure 3:
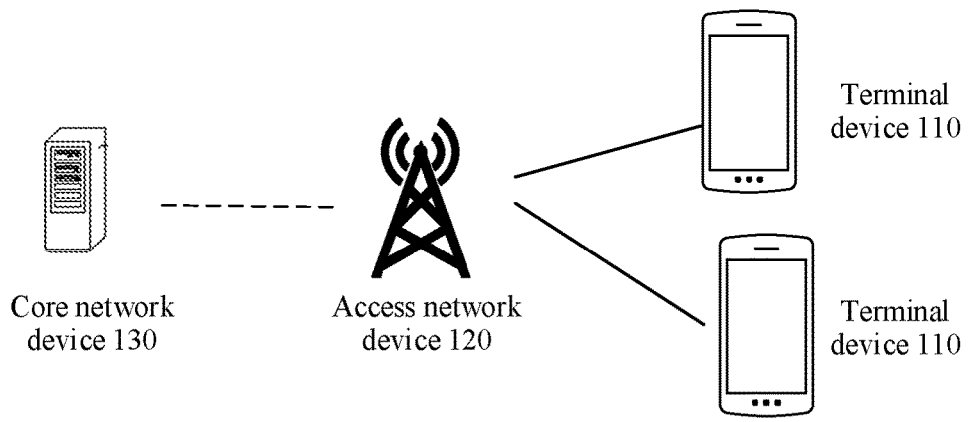
FIG. 3 is a schematic diagram of a network architecture according to an embodiment.

FIG. 3 is a schematic diagram of a network architecture, including a terminal device 110 and an access network device 120. The terminal device 110 and the access network device 120 may communicate with each other through a Uu air interface. The Uu air interface may be understood as a universal UE to network interface. Transmission through the Uu air interface includes uplink transmission and downlink transmission.

The uplink transmission means that the terminal device 110 sends uplink information to the access network device 120. The uplink information may include one or more of the following information: uplink data information, uplink control information, and a reference signal (RS). A channel for transmitting uplink information is referred to as an uplink channel, which may be a PUSCH or a physical uplink control channel (PUCCH). The PUSCH is used to carry uplink data, and the uplink data may also be referred to as the uplink data information. The PUCCH is used to carry uplink control information (UCI) fed back by the terminal device. The UCI may include channel state information (CSI), an acknowledgement (ACK) or a negative acknowledgement (NACK), and the like. The downlink transmission means that the access network device 120 sends downlink information to the terminal device 110. The downlink information may include one or more of the following information: downlink data information, downlink control information, and a downlink reference signal. The downlink reference signal may be a channel state information reference signal (CSI-RS) or a phase tracking reference signal (PTRS). A channel for transmitting the downlink information is referred to as a downlink channel. The downlink channel may be a physical downlink shared channel (PDSCH) or a physical downlink control channel (PDCCH). The PDCCH is used to carry downlink control information (DCI). The PDSCH is used to carry downlink data, which may also be referred to as the downlink data information.

Optionally, the network architecture shown in FIG. 3 may further include a core network device 130. The terminal device 110 may be connected to the access network device 120 wirelessly, and the access network device 120 may be connected to the core network device 130 by wire or wirelessly. Further, the network architecture may include another network device, for example, a wireless relay device and a wireless backhaul device. This is not limited. The access network device 120 and the core network device 130 may be different independent physical devices. Alternatively, the access network device 120 and the core network device 130 may be a same physical device, where all or some logical functions of the core network device 130 and the access network device 120 are integrated into the physical device.

Quantities of core network devices, access network devices, and terminal devices included in the network architecture shown in FIG. 3 are not limited. For example, the network architecture may include one core network device, two radio access network devices, and one terminal device, where the two radio access network devices may both serve the one terminal device. The two radio access network devices may be TRP #1 and TRP #2. In this embodiment of this application, TRP #1 and TRP #2 may be two gNBs, or may be two DUs in a CU-DU architecture, or may be two remote radio units (RRUs) in a gNB.

Embodiments provide an uplink power control method and apparatus. A principle of the method is as follows: A terminal device calculates transmit power of first PUSCH repetition and transmit power of second PUSCH repetition using two groups of different power control parameters, respectively. Compared with a method for calculating the transmit power of the first PUSCH repetition and the transmit power of the second PUSCH repetition by using a same group of power control parameters, this method can ensure performance of PUSCH repetition transmission and improve reliability of the PUSCH repetition transmission.

Figure 4:
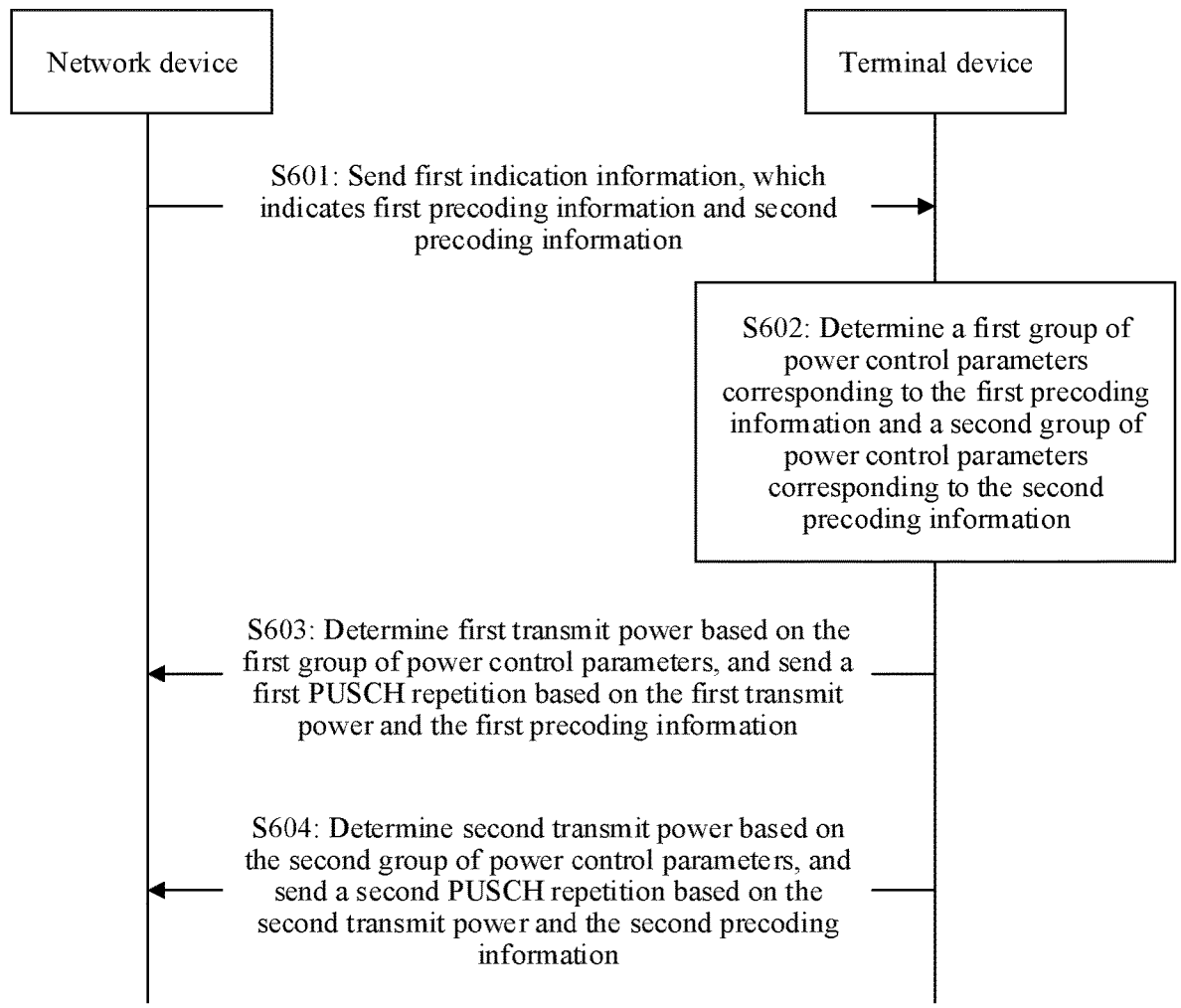
FIG. 4, FIG. 5, FIG. 6 and FIG. 7 each are a flowchart of a communication method according to an embodiment.

FIG. 4 is a flowchart of an uplink power control method. The method may be performed by a terminal device and a network device, or may be performed by a chip in the terminal device and a chip in the network device. The method includes the following steps.

S601: The network device sends first indication information to the terminal device, where the first indication information indicates first precoding information and second precoding information, the first precoding information corresponds to first PUSCH repetition, and the second precoding information corresponds to second PUSCH repetition. Correspondingly, the terminal device receives the first indication information.

For example, the network device may indicate two pieces of precoding information in N pieces of precoding information via the first indication information. The two pieces of precoding information are the first precoding information and the second precoding information. N is an integer greater than 2, and the N pieces of precoding information may be protocol-defined, or may be preconfigured by the network device for the terminal device. The precoding information may be a precoding matrix, and the first indication information may be a transmitted precoding matrix indicator (transmitted precoding matrix indicator, TPMI). When N is 6, for a correspondence between six precoding matrices and TPMIs corresponding to the six precoding matrices, refer to Table 1. For example, when TPMI indexes carried in the first indication information are 0 and 1, a first precoding matrix may be $$\frac{1}{\sqrt{2}}\begin{bmatrix}1\\0\end{bmatrix},$$

and a second precoding matrix may be $$\frac{1}{\sqrt{2}}\begin{bmatrix}0\\1\end{bmatrix}.$$

TABLE 1

| TPMI index | Precoding matrix | | | | | |
|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

S602: The terminal device determines a first group of power control parameters corresponding to the first precoding information and a second group of power control parameters corresponding to the second precoding information.

The first group of power control parameters and the second group of power control parameters are two groups of power control parameters in a power control parameter set. In an example, the power control parameter set may include at least one of the following sets: a PUSCH open-loop power control parameter set, a PUSCH path loss reference signal group set, or a closed-loop accumulated process number set. The PUSCH open-loop power control parameter set includes one or more groups of open-loop power control parameters constituted by a basic power control parameter P0 and a path loss compensation factor alpha, the PUSCH path loss reference signal group set includes one or more path loss reference signal indexes qd, and the closed-loop accumulated process number set includes one or more closed-loop accumulated process numbers l. The power control parameter set may be protocol-predefined, or may be preconfigured by the network device for the terminal device. This is not limited.

In a possible implementation, the network device may send, to the terminal device, second indication information, indicating the first group of power control parameters and the second group of power control parameters. The terminal device may determine, from the power control parameter set based on the second indication information, the first group of power control parameters corresponding to the first precoding information and the second group of power control parameters corresponding to the second precoding information. Alternatively, the terminal device may determine, from the power control parameter set according to a preset rule, the first group of power control parameters corresponding to the first precoding information and the second group of power control parameters corresponding to the second precoding information. The preset rule includes: two groups of power control parameters with smallest indexes in the power control parameter set are the first group of power control parameters and the second group of power control parameters. For example, a group of power control parameters with a smallest index may be the first group of power control parameters, and a group of power control parameters with a second smallest index may be the second group of power control parameters. Alternatively, a group of power control parameters with a second smallest index may be the first group of power control parameters, and a group of power control parameters with a smallest index may be the second group of power control parameters. Alternatively, the first indication information further indicates the first group of power control parameters and the second group of power control parameters. The terminal device may determine the first group of power control parameters and the second group of power control parameters from the power control parameter set based on the first indication information.

In a possible implementation, the power control parameter set includes only the PUSCH open-loop power control parameter set. The first group of power control parameters and the second group of power control parameters may be a first group of open-loop power control parameters and a second group of open-loop power control parameters. A specific process may be as follows.

The network device may preconfigure the PUSCH open-loop power control parameter set for the terminal device using a higher-layer parameter (for example, a parameter p0-AlphaSets). The set includes a plurality of groups of open-loop power control parameters, and each group of open-loop power control parameters corresponds to one identifier (ID). For example, the PUSCH open-loop power control parameter set includes four groups of open-loop power control parameters with identifiers 0, 1, 2, and 3: (P0_0, alpha_0), (P0_1, alpha_1), (P0_2, alpha_2), and (P0_3, alpha_3). The network device may send the second indication information to the terminal device, where the second indication information may carry identifiers of two groups of open-loop power control parameters. The terminal device may determine the first group of open-loop power control parameters and the second group of open-loop power control parameters based on the identifiers of the two groups of open-loop power control parameters. For example, if identifiers carried in the second indication information are 0 and 1, (P0_0, alpha_0) corresponding to the identifier 0 is the first group of power control parameters, and (P0_1, alpha_1) corresponding to the identifier 1 is the second group of power control parameters. Alternatively, (P0_0, alpha_0) corresponding to the identifier 0 is the second group of power control parameters, and (P0_1, alpha_1) corresponding to the identifier 1 is the first group of power control parameters. This is not limited. The foregoing process of indicating the first group of power control parameters and the second group of power control parameters via the first indication information is similar to the foregoing process. This is not additionally described herein. Alternatively, a manner in which the terminal device selects the first group of power control parameters and the second group of power control parameters from a PUSCH open-loop power control parameter set may be protocol-predefined. For example, a power control parameter group with a smallest identifier, that is, (P0_0, alpha_0), is the first group of power control parameters, and a power control parameter group with a second smallest identifier, that is, (P0_1, alpha_1), is the second group of power control parameters. Alternatively, a power control parameter group with a second smallest identifier, that is, (P0_1, alpha_1), is the first group of power control parameters, and a power control parameter group with a smallest identifier, that is, (P0_0, alpha_0), is the second group of power control parameters.

In a possible implementation, the power control parameter set includes only the PUSCH path loss reference signal group set. The first group of power control parameters and the second group of power control parameters may be a first group of path loss reference signals and a second group of path loss reference signals. Each group of path loss reference signals may include one or more synchronization signal blocks (SSBs) and/or one or more CSI-RSs. A specific process may be as follows.

The network device may configure the PUSCH path loss reference signal group set for the terminal device using a higher-layer parameter (for example, a parameter pathlossReferenceRSToAddModList). The PUSCH path loss reference signal group set includes one or more groups of path loss reference signals, and each group of path loss reference signals is corresponding to one identifier. The network device may send the second indication information to the terminal device, where the second indication information may carry identifiers of two groups of path loss reference signal groups. The terminal device may determine the first group of path loss reference signals and the second group of path loss reference signals based on the identifiers of the two groups of path loss reference signal groups. The foregoing process of determining the first group of path loss reference signals and the second group of path loss reference signals based on the first indication information is similar to the foregoing process. This is not additionally described herein. Alternatively, the terminal device may determine the first group of path loss reference signals and the second group of path loss reference signals based on a protocol-predefinition. For example, a path loss reference signal group with a smallest index, that is, pusch-PathlossReferenceRS-0, may be the first group of path loss reference signals, and a path loss reference signal group with a second smallest index, that is, pusch-PathlossReferenceRS-1, may be the second group of path loss reference signals. Alternatively, a path loss reference signal group with a second smallest index, that is, pusch-PathlossReferenceRS-1, may be the first group of path loss reference signals, and a path loss reference signal group with a smallest index, that is, pusch-PathlossReferenceRS-0, may be the second group of path loss reference signals. This is not limited.

When the power control parameter set includes a plurality of sets, the terminal device may determine corresponding power control parameters in the plurality of sets respectively, to form the first group of power control parameters and the second group of power control parameters. For example, the first indication information or the second indication information may carry two identifiers. The terminal device may determine, from the plurality of sets, power control parameters corresponding to the two identifiers respectively, to form the first group of power control parameters and the second group of power control parameters. For example, the power control parameter set includes the PUSCH open-loop power control parameter set and the PUSCH path loss reference signal group set. If identifiers carried in the first indication information and the second indication information are 0 and 1, the terminal device may determine (P0_0, alpha_0) and (P0_1, alpha_1) in the PUSCH open-loop power control parameter set based on the identifiers 0 and 1. Similarly, the terminal device may determine pusch-PathlossReferenceRS-0 and pusch-PathlossReferenceRS-1 in the PUSCH path loss reference signal group set based on the identifier 0 and the identifier 1. The first group of power control parameters may include {P0_0, alpha_0, pusch-PathlossReferenceRS-0}, and the second group of power control parameters may include {P0_1, alpha_1 pusch-PathlossReferenceRS-1}. Alternatively, the first group of power control parameters may include {P0_1, alpha_1, pusch-PathlossReferenceRS-1}, and the second group of power control parameters may include {P0_0, alpha_0 pusch-PathlossReferenceRS-0}. This is not limited. Alternatively, the terminal device may determine different power control parameters in different sets according to a predefined rule, to form the first group of power control parameters and the second group of power control parameters. Still in the foregoing example, the power control parameter set includes the PUSCH open-loop power control parameter set and the PUSCH path loss reference signal group set. The terminal device may determine, from the PUSCH open-loop power control parameter set according to a predefined rule, a power control parameter (P0_0, alpha_0) with a smallest index and a power control parameter (P0_1, alpha_1) with a second smallest index. The terminal device determines, from the PUSCH path loss reference signal group set, a path loss reference signal pusch-PathlossReferenceRS-0 with a smallest index and a path loss reference signal pusch-PathlossReferenceRS-1 with a second smallest index. Finally, {P0_0, alpha_0, pusch-PathlossReferenceRS-0} constitute the first group of power control parameters includes and {P0_1, alpha_1 pusch-PathlossReferenceRS-1} constitute the second group of power control parameters; or vice versa. This is not limited.

It should be noted that in the foregoing example, description is provided by using an example in which power control parameters with same indexes are determined in the plurality of sets to constitute the first group of power control parameters and the second group of power control parameters. Certainly, power control parameters with different indexes may be determined in the plurality of sets, to constitute the first group of power control parameters and the second group of power control parameters. In this case, the first indication information or the second indication information needs to indicate a power control parameter identifier corresponding to the first indication information or the second indication information in each set. Optionally, the first indication information or the second indication information may include identifiers of different sets. Still in the foregoing example, the power control parameter set includes the PUSCH open-loop power control parameter set and the PUSCH path loss reference signal group set. For ease of subsequent description, an identifier of the PUSCH open-loop power control parameter set may be set to set 0, and an identifier of the PUSCH path loss reference signal group set may be set to set 1. The first indication information or the second indication information may include set 0, a first identifier and a second identifier in set 0, set 1, and a third identifier and a fourth identifier in set 1. The terminal device may determine two groups of open-loop power control parameters in set 0 based on the first identifier and the second identifier. Similarly, the terminal device may determine two groups of path loss reference signals in set 1 based on the third identifier and the fourth identifier. Finally, the first group of power control parameters and the second group of power control parameters are respectively constituted based on the two groups of open-loop power control parameters and the two groups of path loss reference signals. Similarly, in this embodiment of this application, different predefined rules may be set in sets to determine power control parameters corresponding to the sets, to constitute the first group of power control parameters and the second group of power control parameters.

S603: The terminal device determines first transmit power based on the first group of power control parameters, and sends the first PUSCH repetition to the network device based on the first transmit power and the first precoding information. Correspondingly, the network device may receive the first PUSCH repetition based on the first precoding information.

S604: The terminal device determines second transmit power based on the second group of power control parameters, and sends the second PUSCH repetition to the network device based on the second transmit power and the second precoding information. Correspondingly, the network device may receive the second PUSCH repetition based on the second precoding information. A relationship between time-frequency resources occupied by the first PUSCH repetition and the second PUSCH repetition may be as follows: Time domain resources are the same, and frequency domain resources do not overlap each other; or frequency domain resources are the same, and time domain resources do not overlap each other.

Optionally, a process in which the terminal device determines the first transmit power based on the first group of power control parameters or the terminal device determines the second transmit power based on the second group of power control parameters may meet the following condition:

$$P_{PUSCH,b,f,c}(i, j, q_d, l) = \min\left\{\begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array}\right\}$$

$P\_{PUSCH,b,f,c}(i, j, q_d, l)$ represents the first transmit power or the second transmit power, $P_{CMAX,f,c}(i)$ represents a maximum transmit power of the terminal device, $P_{O\_PUSCH,b,f,c}(j)$ represents an open-loop basic power control parameter, $M_{RB,b,f,c}^{PUSCH}$ represents a bandwidth occupied by the PUSCH, $\alpha_{b,f,c}(j)$ represents a path loss compensation factor (the foregoing alpha), $PL_{b,f,c}(qd)$ represents a path loss measured based on the path loss reference signal group qd, $\Delta_{TF,b,f,c}(i)$ represents an adjustment value of an MCS for PUSCH transmission, and $f_b$, $f_c(i, l)$ represents a closed-loop power adjustment value and is controlled by DCI. Further, $P_{O\_PUSCH,b,f,c}(j)$ may satisfy the following conditions:

$$P_{O\_PUSCH,b,f,c}(j) = P_{O\_NOMINAL\_PUSCH,f,c}(j) + P_{O\_UE\_PUSCH,b,f,c}(j), \text{ where}$$

$P_{O\_PUSCH,b,f,c}(j)$ represents the open-loop basic power control parameter, $P_{O\_UE\_PUSCH,b,f,c}(j)$ represents the basic power control parameter (the foregoing P0), and $P_{O\_NOMINAL\_PUSCH,f,c}(j)$ represents a power control parameter configured using a higher-layer parameter.

It should be noted that in the foregoing two formulas, b represents an activated uplink bandwidth part (uplink bandwidth part, BWP), f represents a carrier, c represents a serving cell, i represents a PUSCH transmission occasion, j represents a parameter set configuration index, l represents a closed-loop power control adjustment index, and qd represents an index of the path loss reference signal group.

Figure 6:
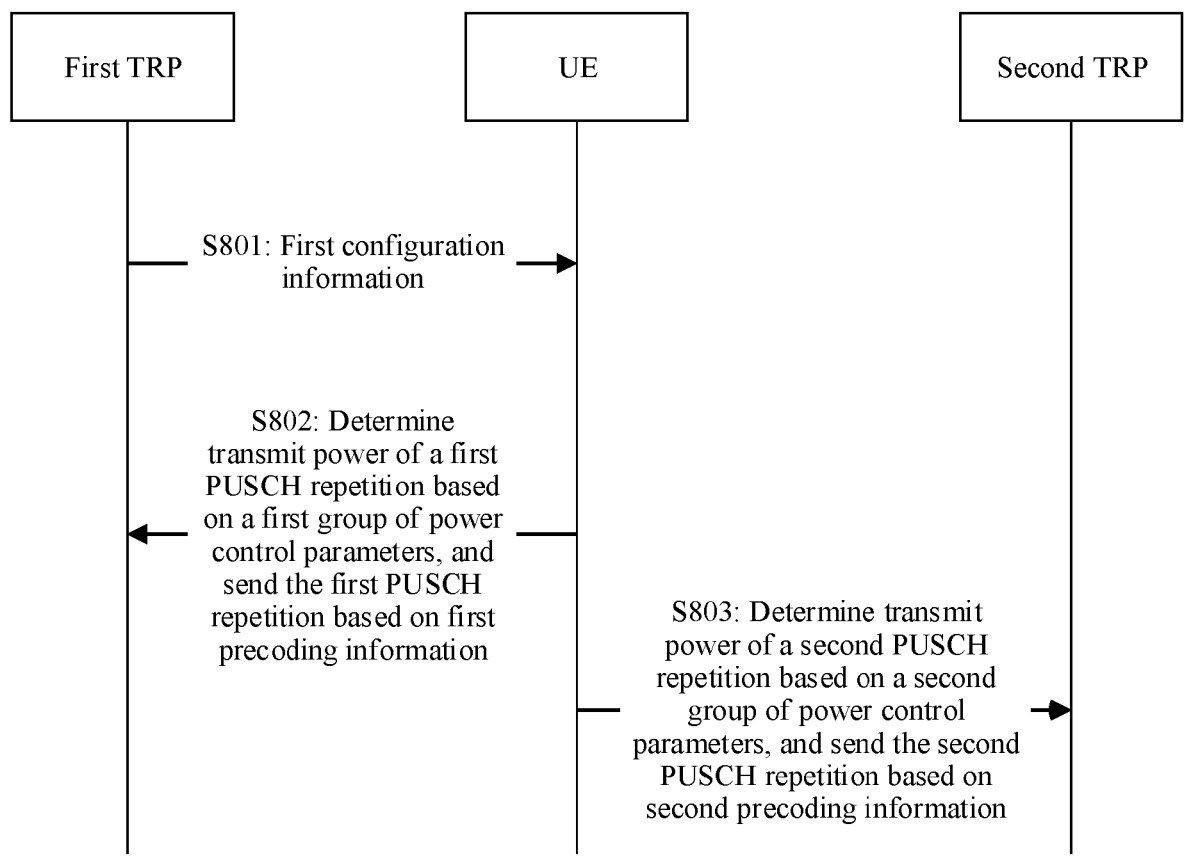

In a possible implementation, the network device in FIG. 6 may include a first TRP and a second TRP. The first TRP may send the first indication information and/or the second indication information to the terminal device. The terminal device may send the first PUSCH repetition to the first TRP, and send the second PUSCH repetition to the second TRP.

It can be learned from the foregoing that in this embodiment, different groups of power control parameters may be determined for different PUSCH repetitions. For example, the first PUSCH repetition corresponds to the first group of power control parameters, and transmit power of the first PUSCH repetition is determined based on the first group of power control parameters. The second PUSCH repetition corresponds to the second group of power control parameters, and transmit power of the second PUSCH repetition is determined based on the second group of power control parameters. Compared with a manner of determining the transmit power of the first PUSCH repetition and the transmit power of the second PUSCH repetition based on a same group of power control parameters, this can improve performance of the PUSCH repetition, and further improve reliability of the PUSCH repetition.

Figure 5:
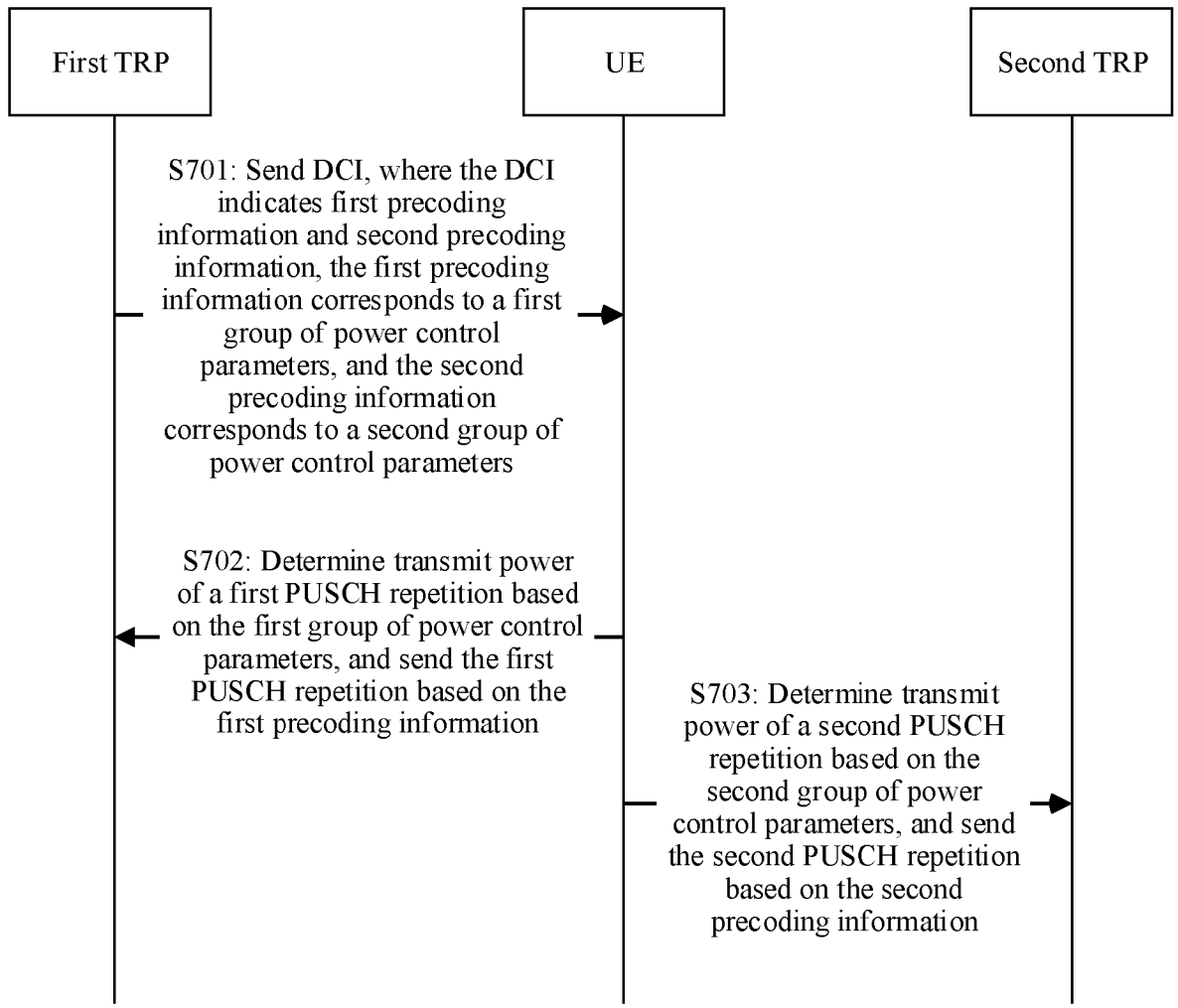

FIG. 5 is a flowchart of an uplink control method. The procedure may be the procedure shown in FIG. 6, and is applied to an example of a scheduling-based PUSCH. The procedure includes the following steps.

S701: A first TRP sends downlink control information DCI to UE, where the DCI indicates the UE to send PUSCH repetition to at least two TRPs. For example, the UE sends first PUSCH repetition to the first TRP, and sends second PUSCH repetition to a second TRP.

The DCI may include a first information field, indicating precoding information corresponding to PUSCH transmission. For example, the first information field indicates first precoding information and second precoding information. The first precoding information corresponds to the first PUSCH repetition, and the second precoding information corresponds to the second PUSCH repetition. The first PUSCH repetition and the second PUSCH repetition transmit a same transport block. Redundancy versions corresponding to the first PUSCH repetition and the second PUSCH repetition are the same or different. Optionally, the first information field may further include a quantity of layers, in addition to the precoding information.

In a possible implementation, the DCI may alternatively include a second information field, indicating a first group of power control parameters and a second group of power control parameters. The first group of power control parameters and the second group of power control parameters each may include at least one of the following: a basic power control parameter P0, a path loss compensation factor alpha, a path loss reference signal group index qd, and a closed-loop accumulated process number l. Optionally, the power control parameters included in the first group of power control parameters and the power control parameters included in the second group of power control parameters are the same type. For example, if the first group of power control parameters include P0, alpha, and qd, the second group of power control parameters also include P0, alpha, and qd. Similarly, if the first group of power control parameters include only P0 and alpha, the second group of power control parameters also include only P0 and alpha. The second information field may be an SRS resource indication.

In another possible implementation, the DCI may not include the second information field, and a terminal device may select, by using a predefined rule and from a power control parameter set configured by using a higher-layer parameter, two groups of power control parameters: the first group of power control parameters and the second group of power control parameters.

In another possible implementation, the first information field may be the SRS resource indication and the first information field further indicates the first group of power control parameters and the second group of power control parameters. The terminal device may determine the first group of power control parameters and the second group of power control parameters based on first indication information. For details of a process in which the terminal device selects two groups of power control parameters based on the second information field, the predefined rule, or the first information field, refer to description in FIG. 6. No additional description is provided herein.

S702: The terminal device determines transmit power of the first PUSCH repetition based on the first group of power control parameters, and sends the first PUSCH repetition to the first TRP based on the first precoding information.

S703: The terminal device determines transmit power of the second PUSCH repetition based on the second group of power control parameters, and sends the second PUSCH repetition to the second TRP based on the second precoding information.

It can be learned from the foregoing that the terminal device may determine two groups of power control parameters based on scheduling of one piece of DCI. In addition, the transmit power of the first PUSCH repetition and the transmit power of the second PUSCH repetition may be respectively determined based on the two groups of power control parameters, so that transmit powers of PUSCHs sent to different TRPs are determined by using independent power control parameters. In this way, the transmission parameter and the power of the PUSCH are more adaptive to a channel on which the PUSCH is located, thereby improving transmission reliability and transmission performance.

FIG. 6 is a flowchart of an uplink power control method. The procedure may be an example in which the procedure shown in FIG. 6 is applied to a type-1 uplink configured grant PUSCH. The procedure includes the following steps.

S801: A first TRP sends first configuration information to UE, where the first configuration information may be a radio resource control (RRC) configured uplink grant, or a configured grant configuration. The first configuration information may indicate the UE to send PUSCH repetitions to at least two TRPs. For example, the UE is indicated to send a first PUSCH repetition to the first TRP, and to send a second PUSCH repetition to a second TRP.

In a design, the first configuration information may include a first parameter, where the first parameter may indicate first precoding information and second precoding information. The first precoding information corresponds to the first PUSCH repetition, and the second precoding information corresponds to the second PUSCH repetition. Optionally, the first configuration information may further include a second parameter, which may indicate a first group of power control parameters and a second group of power control parameters. Alternatively, the terminal device may select, in a predefined manner from a power control parameter set, two groups of power control parameters as the first group of power control parameters and the second group of power control parameter.

In a possible implementation, the power control parameter set includes a path loss reference signal group set and an open-loop power control parameter set constituted by P0 and alpha. The first configuration information includes a second parameter A and a second parameter B. The second parameter A indicates two groups of open-loop power control parameters in the open-loop power control parameter set: a first group of open-loop power control parameters and a second group of open-loop power control parameters. The second parameter B indicates two groups of path loss reference signals in the path loss reference signal group set: a first group of path loss reference signals and a second group of path loss reference signals. The first group of open-loop power control parameters and the first group of path loss reference signals may constitute the first group of power control parameters, meaning that the first group of power control parameters include {the first group of open-loop power control parameters, the first group of path loss reference signals}. The second group of open-loop power control parameters and the second group of path loss reference signals may constitute the second group of power control parameters, meaning that the second group of power control parameters include {the second group of open-loop power control parameters, the second group of path loss reference signals}. Alternatively, the terminal device may determine the first group of open-loop power control parameters and the second group of open-loop power control parameters from the open-loop power control parameter set according to a predefined rule. Similarly, the first group of path loss reference signals and the second group of path loss reference signals are determined in the foregoing path loss reference signal group set according to a predefined rule. Finally, the first group of open-loop power control parameters and the first group of path loss reference signals form the first group of power control parameters. The second group of open-loop power control parameters and the second group of path loss reference signals form the second group of power control parameters.

Alternatively, in another design, the first configuration information includes the first parameter and the second parameter, the first parameter indicates the first precoding information, and the second parameter indicates the second precoding information. The first precoding information corresponds to the first PUSCH repetition, and the second precoding information corresponds to the second PUSCH repetition. Optionally, the first configuration information may further include a third parameter and a fourth parameter, and the third parameter indicates the first group of power control parameters, and the fourth parameter indicates the second group of power control parameters. The first group of power control parameters indicated by the third parameter is applied to the first PUSCH repetition, and the second group of power control parameters indicated by the fourth parameter is applied to the second PUSCH repetition. The third parameter and the fourth parameter may include P0, alpha, a closed-loop process number l, a path loss reference signal index, and the like.

In a possible implementation, the first group of power control parameters may include the first group of open-loop power control parameters and the first group of path loss reference signals, and the second group of power control parameters may include the second group of open-loop power control parameters and the second group of path loss reference signals.

S802: The UE calculates transmit power of the first PUSCH repetition based on the first group of power control parameters, and sends the first PUSCH repetition based on the first precoding information.

S803: The UE calculates transmit power of the second PUSCH repetition based on the second group of power control parameters, and sends the second PUSCH repetition based on the second precoding information.

In a solution, one set of configured grant configures at least two PUSCH repetitions to be separately sent to different TRPs. However, one set of configured grant can indicate only one group of power control parameters. As a result, power determined for PUSCHs destined for different TRPs is the same. In this embodiment of this application, two sets of power control parameters are configured for PUSCH repetition transmission, so that transmit power of PUSCHs destined for different TRPs is determined by using independent power control parameters. In this way, the transmission parameter and the power of the PUSCH are more adaptive to a channel on which the PUSCH is located, thereby improving transmission reliability and improving transmission performance.

Figure 7:
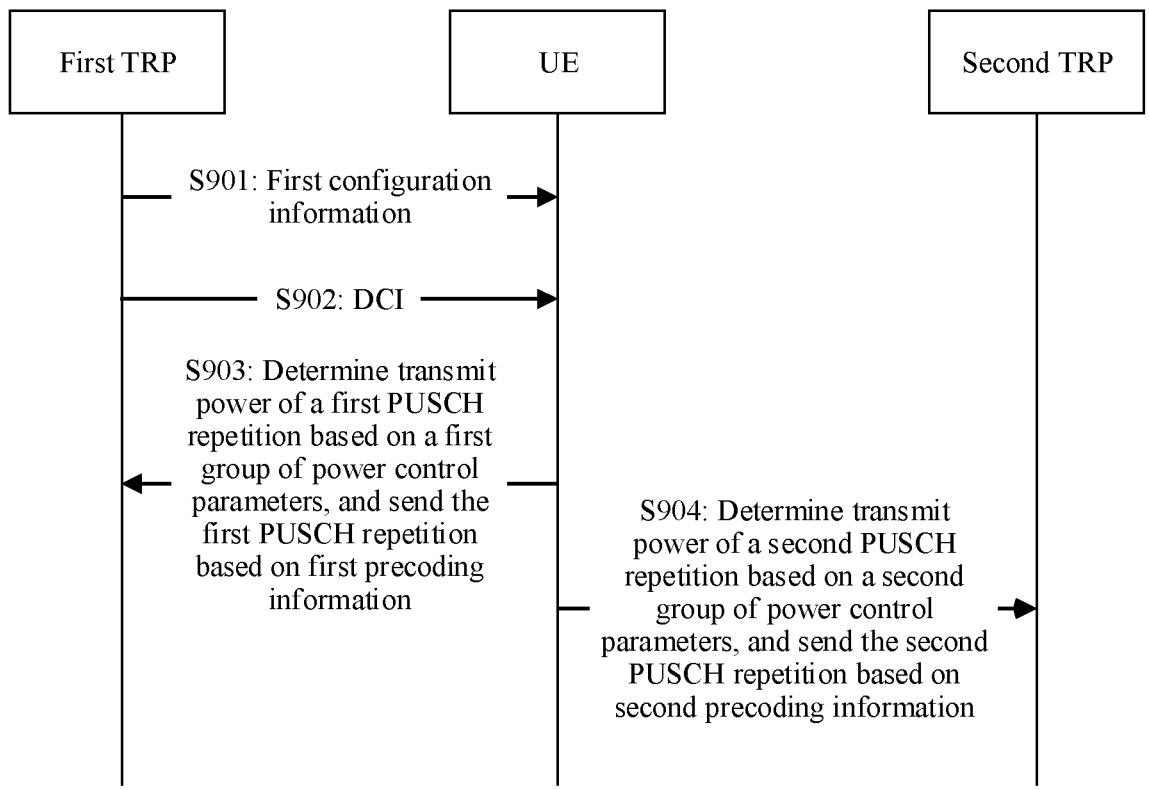

FIG. 7 is a flowchart of an uplink power control method. The procedure may be an example in which the procedure shown in FIG. 6 is applied to a type-2 configured grant PUSCH. The procedure includes the following steps.

S901: A first TRP sends, to UE, first configuration information for configuring a power control parameter set.

S902: The first TRP sends DCI to the UE, where the DCI indicates the UE to send a PUSCH repetition to at least two TRPs. For example, the UE is indicated to send a first PUSCH repetition to the first TRP, and to send a second PUSCH repetition to a second TRP.

In a possible implementation, the DCI in S902 may include a first information field, where the first information field indicates first precoding information and second precoding information. The first precoding information corresponds to the first PUSCH repetition and the second precoding information corresponds to the second PUSCH repetition. The DCI may further include a second information field, where the second information field indicates a first group of power control parameters and a second group of power control parameters. The first group of power control parameters correspond to the first PUSCH repetition and the second group of power control parameters correspond to the second PUSCH repetition. Optionally, the second information field may be an SRS resource indication. Alternatively, the DCI may not include the second information field. The terminal device may determine the first group of power control parameters and the second group of power control parameters from the power control parameter set according to a predefined rule. Alternatively, the first configuration information in S901 may include a first parameter, and the first parameter indicates the first group of power control parameters and the second group of power control parameters. Correspondingly, the UE may determine the first group of power control parameters and the second group of power control parameters based on the first parameter in the first configuration information.

S903: The UE calculates transmit power of the first PUSCH repetition based on the first group of power control parameters, and sends the first PUSCH repetition based on the first precoding information.

S904: The UE calculates transmit power of the second PUSCH repetition based on the second group of power control parameters, and sends the second PUSCH repetition based on the second precoding information.

In this embodiment of this application, two groups of power control parameters are indicated or configured for PUSCH repetition transmission, so that transmit power of PUSCHs destined for different TRPs is determined by using independent power control parameters. In this way, the transmission parameter and the power of the PUSCH are more adaptive to a channel on which the PUSCH is located, thereby improving transmission reliability and transmission performance.

It should be noted that the uplink power control method provided in this embodiment of this application may be further used to calculate transmit power of a PUCCH repetition, in addition to calculating transmit power of PUSCH repetition. In other words, "PUSCH repetition" in this embodiment of this application may be replaced with "PUCCH repetition". For example, in a specific implementation, a network device may send, to a terminal device, configuration information for configuring two groups of PUCCH power control parameters for the terminal device: a first group of PUCCH power control parameters and a second group of PUCCH power control parameters. The first group of PUCCH power control parameters and the second group of PUCCH power control parameters each may include a basic power control parameter P0 and/or a path loss reference signal group index qd and the like. The terminal device may determine transmit power of a first PUCCH based on a first PUCCH power control parameter and sends, to the network device, a first PUCCH repetition based on the transmit power of the first PUCCH; and determine second transmit power of a second PUCCH based on a second PUCCH power control parameter, and sends, to the network device, a second PUCCH repetition based on the transmit power of the second PUCCH.

In the foregoing embodiments provided in this application, the methods provided in embodiments of this application are separately described from the perspective of the network device, the terminal device, and interaction between the network device and the terminal device. To implement the functions in the methods provided in embodiments of this application, the network device and the terminal device each may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 8:
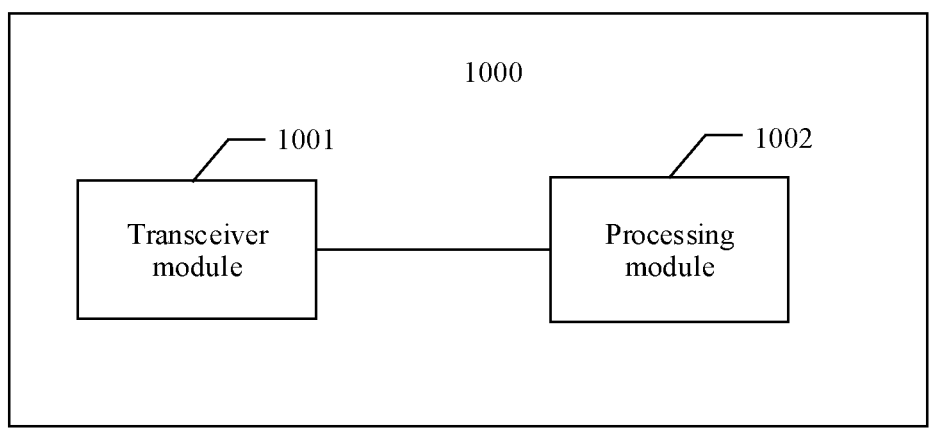
FIG. 8 and FIG. 9 each are a schematic diagram of a communication apparatus according to an embodiment.
Figure 9:
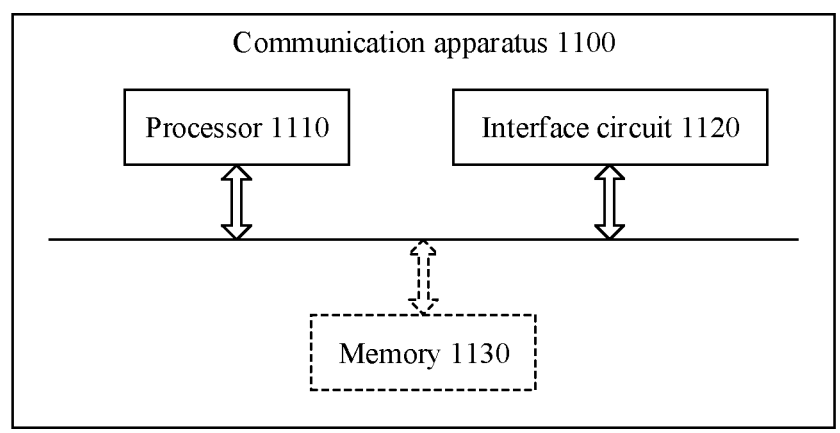

FIG. 8 and FIG. 9 each are a schematic diagram of a structure of a possible communication apparatus according to an embodiment of this application. The communication apparatuses may implement functions of the terminal device or the network device in the foregoing method embodiments. Therefore, beneficial effects of the foregoing method embodiments can also be achieved. A communication apparatus 1000 shown in FIG. 8 includes a transceiver module 1001 and a processing module 1002.

In a possible implementation, the communication apparatus 1000 is configured to implement functions of the terminal device in the procedure in FIG. 4. For example, the transceiver module 1001 is configured to receive first indication information from a network device, where the first indication information indicates first precoding information and second precoding information, the first precoding information corresponds to a first physical uplink shared channel PUSCH repetition, and the second precoding information corresponds to a second PUSCH repetition. The processing module 1002 is configured to determine a first group of power control parameters corresponding to the first precoding information and a second group of power control parameters corresponding to the second precoding information. The processing module 1002 is further configured to determine first transmit power based on the first group of power control parameters, and control the transceiver module 1001 to send the first PUSCH repetition based on the first transmit power and the first precoding information; determine second transmit power based on the second group of power control parameters; and send, by controlling the transceiver module 1001, the second PUSCH repetition based on the second transmit power and the second precoding information.

Optionally, the transceiver module 1001 is further configured to receive second indication information from the network device, where the second indication information indicates the first group of power control parameters and the second group of power control parameter. The processing module 1002 determines the first group of power control parameters corresponding to the first precoding information and the second group of power control parameters corresponding to the second precoding information, and specifically, the processing module 1002 determines, from a power control parameter set based on the second indication information, the first group of power control parameters corresponding to the first precoding information and the second group of power control parameters corresponding to the second precoding information.

Optionally, the processing module 1002 determines the first group of power control parameters corresponding to the first precoding information and the second group of power control parameters corresponding to the second precoding information, and the processing module 1002 determines, from a power control parameter set according to a preset rule, the first group of power control parameters corresponding to the first precoding information and the second group of power control parameters corresponding to the second precoding information.

Optionally, the preset rule includes: the first group of power control parameters and the second group of power control parameters are two groups of power control parameters with smallest indexes in the power control parameter set.

Optionally, the power control parameter set includes at least one of the following sets: a PUSCH open-loop power control parameter set, a PUSCH path loss reference signal group set, and a closed-loop accumulated process number set, where the PUSCH open-loop power control parameter set includes one or more groups of open-loop power control parameters constituted by a basic power control parameter P0 and a path loss compensation factor alpha, the PUSCH path loss reference signal group set includes one or more path loss reference signal indexes qd, and the closed-loop accumulated process number set includes one or more closed-loop accumulated process numbers l.

Optionally, the first indication information further indicates the first group of power control parameters and the second group of power control parameters.

Optionally, the first group of power control parameters and the second group of power control parameters each include at least one of the following: the basic power control parameter P0, the path loss compensation factor alpha, the path loss reference signal group index qd, and the closed-loop accumulated process number l.

In another possible implementation, the communication apparatus 1000 is configured to implement functions of the network device in the procedure in FIG. 4. For example, the transceiver module 1001 is configured to send first indication information to a terminal device, where the first indication information indicates first precoding information and second precoding information, the first precoding information corresponds to a first group of power control parameters for a first physical uplink shared channel PUSCH repetition, and the second precoding information corresponds to a second group of power control parameters for a second PUSCH repetition. The processing module 1002 is configured to receive, by controlling the transceiver module 1001, the first PUSCH repetition from the terminal device based on the first precoding information.

Optionally, the transceiver module 1001 is further configured to send second indication information to the terminal device, where the second indication information indicates the first group of power control parameters and the second group of power control parameters in a power control parameter set.

Optionally, the processing module 1002 is further configured to determine, from a power control parameter set according to a preset rule, the first group of power control parameters corresponding to the first precoding information.

Optionally, the preset rule includes: either of two groups of power control parameters with smallest indexes in the power control parameter set is the first group of power control parameters.

Optionally, the power control parameter set includes at least one of the following sets: a PUSCH open-loop power control parameter set, a PUSCH path loss reference signal group set, and a closed-loop accumulated process number set, where the PUSCH open-loop power control parameter set includes one or more groups of open-loop power control parameters constituted by a basic power control parameter P0 and a path loss compensation factor alpha, the PUSCH path loss reference signal group set includes one or more path loss reference signal indexes qd, and the closed-loop accumulated process number set includes one or more closed-loop accumulated process numbers l.

Optionally, the first indication information further indicates the first group of power control parameters and the second group of power control parameters.

Optionally, the first group of power control parameters and the second group of power control parameters each include at least one of the following: the basic power control parameter P0, the path loss compensation factor alpha, the path loss reference signal group index qd, and the closed-loop accumulated process number l.

For more detailed descriptions of the transceiver module 1001 and the processing module 1002, refer to the foregoing method embodiments. Details are not described herein again.

As shown in FIG. 9, a communication apparatus 1100 includes a processor 1110 and an interface circuit 1120. The processor 1110 and the interface circuit 1120 are coupled to each other. It may be understood that the interface circuit 1120 may be a transceiver or an input/output interface. Optionally, the communication apparatus 1100 may further include a memory 1130 for storing instructions executed by the processor 1110, or input data required by the processor 1110 to run the instructions, or data generated after the processor 1110 runs the instructions.

When the communication apparatus 1100 is configured to implement the method in the foregoing method embodiment, the processor 1110 is configured to perform functions of the processing module 1002, and the interface circuit 1120 is configured to perform functions of the transceiver module 1001.

When the communication apparatus is a chip used in a terminal device, the chip in the terminal device implements functions of the terminal device in the foregoing method embodiment. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements a function of the network device in the foregoing method embodiment. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor or the like.

The method steps described above in embodiments may be implemented in a hardware manner, or may be implemented by executing software instructions by the processor. The software instructions may include a corresponding software module. The software module may be stored in a random access memory (RAM), a flash memory, a read-only memory (ROM), a programmable read-only memory (PROM), an erasable programmable read-only memory (erasable EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be alternatively a component of the processor. The processor and the storage medium may be disposed in an ASIC. In addition, the ASIC may be located in the access network device or the terminal device. Certainly, the processor and the storage medium may alternatively exist as discrete components in the access network device or the terminal device.

All or some of the foregoing embodiments may be implemented by software, hardware, firmware, or any combination thereof. When software is used to implement embodiments, all or some of the embodiments may be implemented in the form of a computer program product that includes one or more computer programs or instructions. When the computer programs or the instructions are loaded or executed on a computer, all or a part of the procedures or functions described in embodiments are generated. The computer may be a general-purpose computer, a dedicated computer, a computer network, or other programmable apparatuses. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (SSD).

Unless otherwise stated or there is a logic conflict, terms and/or description between different embodiments are/is consistent and may be mutually referenced, and technical features in different embodiments may be combined based on an internal logical relationship thereof, to form a new embodiment.

In this disclosure, "at least one" means one or more, and "plurality" means two or more. The term "and/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this disclosure, the character "/" indicates a "division" relationship between the associated objects. In addition, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

In addition, the network architecture and the service scenario described in embodiments are intended to describe the technical solutions in embodiments more clearly, and do not constitute any limitation on the technical solutions provided in the described embodiments. A person of ordinary skill in the art may know that the technical solutions provided in embodiments are also applicable to similar technical problems with the evolution of the network architecture and the emergence of new service scenarios. It may be understood that various numbers in embodiments of this disclosure are merely used for differentiation for ease of description, and are not used to limit the scope of described embodiments. Sequence numbers of the foregoing processes do not mean execution sequences. The execution sequences of the processes should be determined according to functions and internal logic of the processes.

What is claimed is:

1. An uplink power control method, comprising:
receiving first indication information from a network device, the first indication information indicating first precoding information and second precoding information, the first precoding information corresponding to a first physical uplink shared channel (PUSCH) repetition and the second precoding information corresponding to a second PUSCH repetition;
determining a first group of power control parameters corresponding to the first precoding information and
a second group of power control parameters corresponding to the second precoding information by determining, from a power control parameter set according to a preset rule, the first group of power control parameters corresponding to the first precoding information and the second group of power control parameters corresponding to the second precoding information, the preset rule comprising the first group of power control parameters and the second group of power control parameters being two groups of power control parameters with smallest indexes in the power control parameter set;

determining first transmit power based on the first group of power control parameters and sending the first PUSCH repetition based on the first transmit power and the first precoding information; and determining second transmit power based on the second group of power control parameters and sending the second PUSCH repetition based on the second transmit power and the second precoding information.

2. The method according to claim 1, further comprising:
receiving second indication information from the network device, the second indication information indicating the first group of power control parameters and the second group of power control parameters, the determining a first group of power control parameters corresponding to the first precoding information and a second group of power control parameters corresponding to the second precoding information comprising:
determining, from a power control parameter set based on the second indication information, the first group of power control parameters corresponding to the first precoding information and the second group of power control parameters corresponding to the second precoding information.

3. The method according to claim 1, the first indication information indicating the first group of power control parameters and the second group of power control parameters.

4. An uplink power control method, comprising:
sending first indication information to a terminal device, the first indication information indicating first precoding information and second precoding information, the first precoding information corresponding to a first group of power control parameters for a first physical uplink shared channel (PUSCH) repetition, and the second precoding information corresponding to a second group of power control parameters for a second PUSCH repetition;
determining, from a power control parameter set according to a preset rule, the first group of power control parameters corresponding to the first precoding information, wherein the preset rule comprises either of two groups of power control parameters with smallest indexes in the power control parameter set being the first group of power control parameters; and
receiving the first PUSCH repetition from the terminal device based on the first precoding information.

5. The method according to claim 4, the method comprising:
sending second indication information to the terminal device, the second indication information indicating the first group of power control parameters and the second group of power control parameters in a power control parameter set.

6. The method according to claim 4, the first indication information indicating the first group of power control parameters and the second group of power control parameters.

7. An uplink power control apparatus, comprising:
a receiver configured to receive first indication information from a network device, the first indication information indicating first precoding information and second precoding information, the first precoding information corresponding to a first physical uplink shared channel (PUSCH) repetition, and the second precoding information corresponding to a second PUSCH repetition;
a processor configured to:
determine a first group of power control parameters corresponding to the first precoding information and a second group of power control parameters corresponding to the second precoding information;
determine, from a power control parameter set according to a preset rule, the first group of power control parameters corresponding to the first precoding information and the second group of power control parameters corresponding to the second precoding information, the preset rule comprising the first group of power control parameters and the second group of power control parameters being two groups of power control parameters with smallest indexes in the power control parameter set;
determine first transmit power based on the first group of power control parameters and send the first PUSCH repetition based on the first transmit power and the first precoding information; and
determine second transmit power based on the second group of power control parameters and send the second PUSCH repetition based on the second transmit power and the second precoding information.

8. The apparatus according to claim 7, the receiver being further configured to:
receive second indication information from the network device, the second indication information indicating the first group of power control parameters and the second group of power control parameters; and
the processor is configured to:
determine, from a power control parameter set based on the second indication information, the first group of power control parameters corresponding to the first precoding information and the second group of power control parameters corresponding to the second precoding information.

9. The apparatus according to claim 7, the first indication information indicating the first group of power control parameters and the second group of power control parameters.

10. An uplink power control apparatus, comprising:
a transmitter configured to send first indication information to a terminal device, the first indication information indicating first precoding information and second precoding information, the first precoding information corresponding to a first group of power control parameters for a first physical uplink shared channel (PUSCH) repetition, and the second precoding information corresponding to a second group of power control parameters for a second PUSCH repetition;
a processor configured to determine, from a power control parameter set according to a preset rule, the first group of power control parameters corresponding to the first precoding information, wherein the preset rule comprises either of two groups of power control parameters with smallest indexes in the power control parameter set being the first group of power control parameters; and
a receiver configured to receive the first PUSCH repetition from the terminal device based on the first precoding information.

11. The apparatus according to claim 10, wherein the transmitter is configured to:
  send second indication information to the terminal device, the second indication information indicating the first group of power control parameters and the second group of power control parameters in a power control parameter set.

12. The apparatus according to claim 10, wherein the first indication information indicates the first group of power control parameters and the second group of power control parameters.

* * * * *